United States Patent
Gili et al.

(10) Patent No.: US 7,350,746 B2
(45) Date of Patent: Apr. 1, 2008

(54) DUAL HULL AIRSHIP CONTROLLED BY THRUST VECTORING

(75) Inventors: Piero Gili, Turin (IT); Ugo Icardi, San Cristoforo (IT); Romualdo Ruotolo, Turin (IT); Manuela Battipede, Turin (IT); Piercarlo Vercesi, Canneto Pavese (IT)

(73) Assignees: Nautilus S.p.A., Tortona (Alessandria) (IT); Politecnico Di Torino, Turin (IT)

( * ) Notice: Subject to any disclaimer, the term of this patent is extended or adjusted under 35 U.S.C. 154(b) by 345 days.

(21) Appl. No.: 10/523,238

(22) PCT Filed: Aug. 11, 2003

(86) PCT No.: PCT/EP03/08950

§ 371 (c)(1), (2), (4) Date: Jan. 19, 2005

(87) PCT Pub. No.: WO2004/016503

PCT Pub. Date: Feb. 26, 2004

(65) Prior Publication Data

US 2005/0258305 A1    Nov. 24, 2005

(30) Foreign Application Priority Data

Aug. 9, 2002   (IT)   ............ MI2002A1815

(51) Int. Cl.
*B64B 1/68*   (2006.01)
(52) U.S. Cl. .......................... 244/30; 244/56
(58) Field of Classification Search ............... 244/30, 244/24, 29, 189, 56, 26
See application file for complete search history.

(56) References Cited

U.S. PATENT DOCUMENTS

| | | | | |
|---|---|---|---|---|
| 1,808,132 A * | 6/1931 | Duering | ................ | 244/30 |
| 5,240,206 A | 8/1993 | Omiya | | |
| 5,383,627 A * | 1/1995 | Bundo | ................ | 244/26 |
| 5,538,203 A * | 7/1996 | Mellady | ................ | 244/97 |
| 6,371,409 B1 * | 4/2002 | Steele | ................ | 244/30 |
| 6,427,943 B2 * | 8/2002 | Yokomaku et al. | ............ | 244/30 |
| 6,527,223 B1 * | 3/2003 | Mondale | ................ | 244/30 |
| 6,837,458 B2 * | 1/2005 | Swearingen et al. | .......... | 244/30 |
| 6,843,448 B2 * | 1/2005 | Parmley | ................ | 244/30 |

FOREIGN PATENT DOCUMENTS

| | | |
|---|---|---|
| EP | 0 583 666 | 2/1994 |
| FR | 2 612 878 | 9/1988 |
| WO | WO 89/10868 | 11/1989 |

* cited by examiner

*Primary Examiner*—Timothy D. Collins
(74) *Attorney, Agent, or Firm*—Hedman & Costigan, P.C.

(57) ABSTRACT

A highly maneuverable aircraft with aerostatic lift consists, in particular, of a non-rigid airship (10) which can be piloted or radio-controlled; the airship (10) is sustained by helium and consists of two spindle-shaped elements side by side (11) joined by a connecting structure (12) to form a characteristic catamaran shape, without deflecting aerodynamic control surfaces as the command system consists of a set of several adjustable electric motors, each driving a variable-pitch propeller (13).

9 Claims, 4 Drawing Sheets

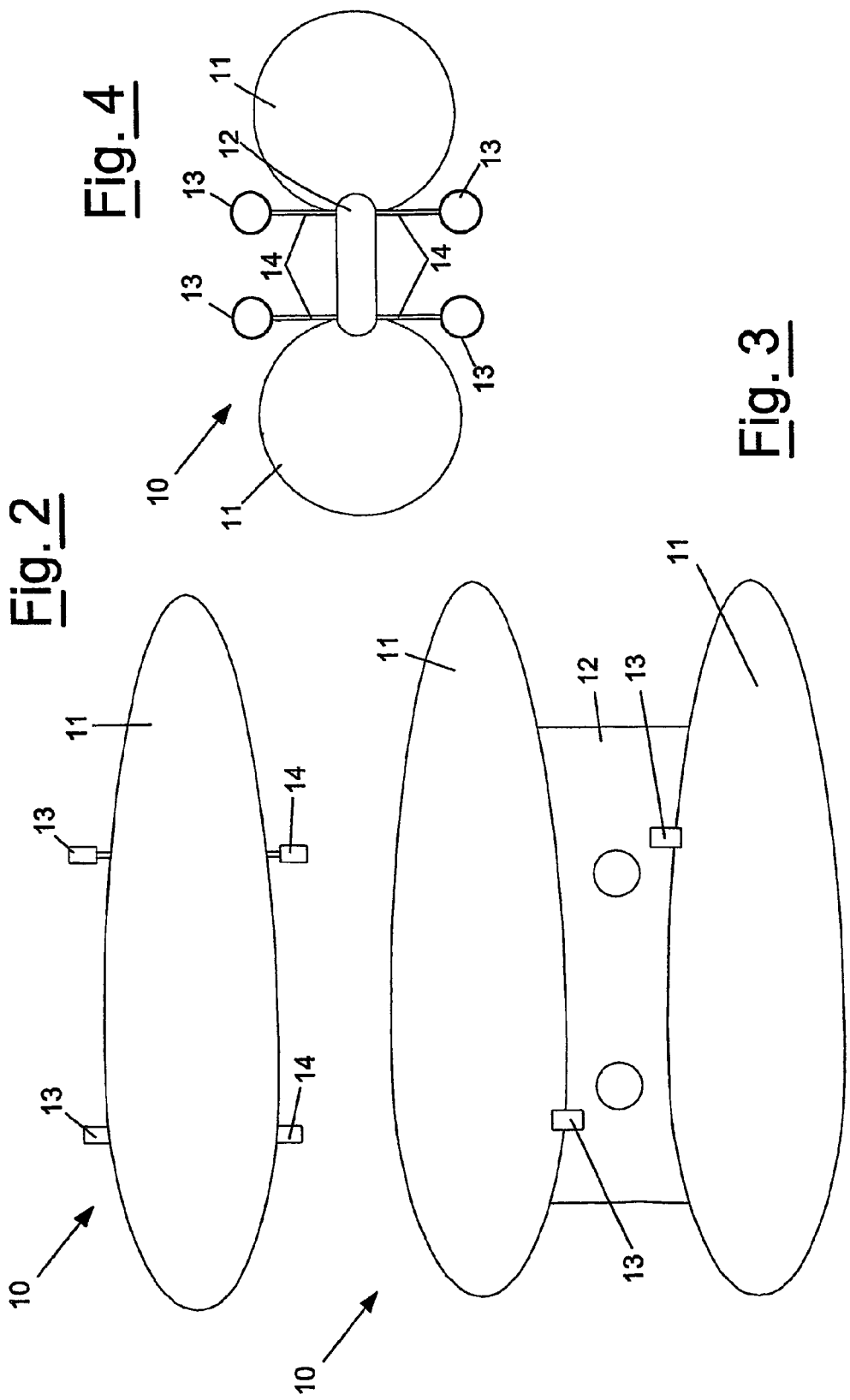

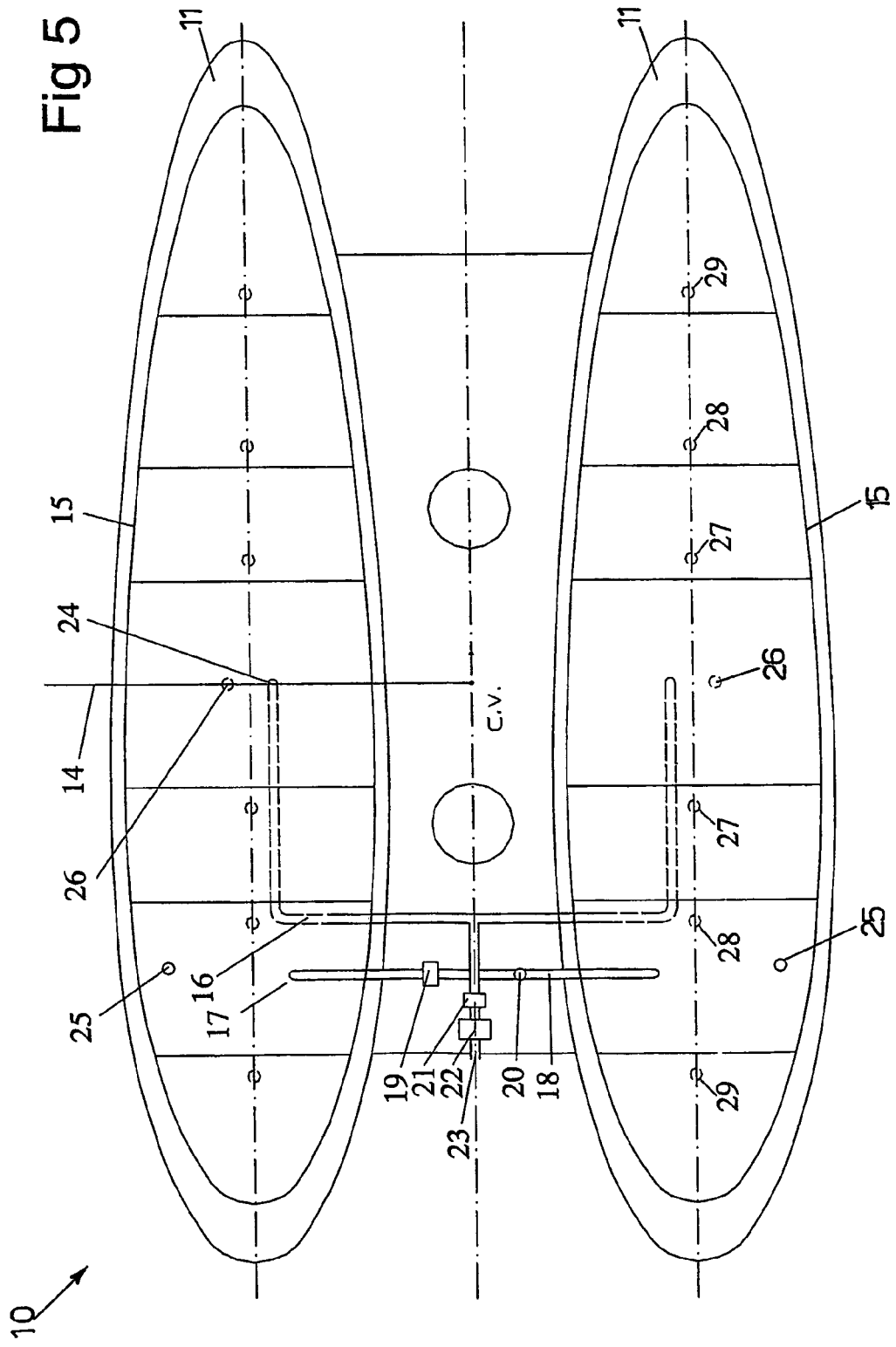

DUAL HULL AIRSHIP CONTROLLED BY THRUST VECTORING

The present invention concerns a highly manoeuvrable aircraft with aerostatic lift.

More particularly, the invention concerns an airship with excellent manoeuvrability characteristics and low lateral wind sensitivity, controlled exclusively by means of thrust vectoring propellers.

Many activities which are or can be performed by aircraft in the atmosphere or with satellites for both commercial and military applications, such as patrolling of territory, analysis of the atmosphere, crops, soil and sub-soil, analysis of water masses at different depths, and of flora and fauna, support for communications, info-mobility, civil defence and police, involve strict limits and considerable disadvantages.

These limits are due mainly to the high speed required by the fixed-wing aircraft to produce the required lift, or to the disturbance of the air flow brought about by the rotating blades of the rotary-wing aircraft, to the excessive distance normally existing between the aircraft and the target object as well as the ecological impact, in terms of both exhausts and noise.

Further drawbacks result from the growing need of safety requirements for people on board and third parties and the costs of traditional aircraft, which are constantly increasing.

On the other hand, airships are still not widely used due to the limits inherent in the solutions currently available, which go back to those developed before and after the Second World War; said limits consist mainly of the large dimensions and low controllability of the airship, the equipment and assistance necessary on the ground, the extreme sensitivity to meteorological conditions and the management of the aircraft, comparable to that of a fixed wing aircraft.

Furthermore, almost all the airships currently used have the classic hull shape with 3 or 4 tail planes for directional control and trim, the gondola for housing the central payload below the hull and the propeller drive engines set according to different kinds of solutions (at the sides of the gondola, in the stern area, at the extreme rear of the hull, etc.).

Examples of catamaran-shaped airships exist, but the twin hulls are covered in one single shell, or squashed shapes maintained by internal diaphragms. These airships generally use the thrust axis rotation to provide the aircraft with a vertical thrust component consistent with the buoyancy. Lastly, they feature a standard command and control system, with direct action of the pilot on the engine thrust and on the aerodynamic surface deflections.

At present, almost all the airships are non-rigid (i.e. without any supporting structure or with the shape requirement ensured simply by a slight gas overpressure), but there are also examples of semi-rigid airships, i.e. with a longitudinal keel that sustains the gondola and contributes to maintain the shape, while rigid airships, i.e. with an internal shaping structure, are now practically non-existent. Normally, the operating airships are used mainly for advertising, scientific purposes and for passenger transportation.

In the present market, remotely-piloted airships represent the most interesting vehicle for low speed, low altitude exploration and monitoring missions; they have already proved themselves as camera and TV platforms as well as specialised scientific tasks.

As a matter of fact its aerostatic lift makes it noiseless, non-obtrusive, ecological and useful for environmental applications, such as oceanographic and agricultural studies, traffic monitoring, ecological and climate research, inspection of endangered ecological sites as well as long-term variability studies.

Actually, airship can operate as a rotary-wing aircraft but it benefits from the absence of rotors, which generally imply high structural design costs and strong payload (camera and monitoring equipment) vibrations.

The most crucial aspect of the conventional airship handling is its scarce capability of operating in adverse environmental conditions.

This is due to the features of the primary command system, which is generally adopted for a conventional airship, together with the low weight and the big size of the whole body.

Aerodynamic surfaces, in fact, are poorly efficient as they are generally covered by the separate stream of the hulls and moreover, in low-to-moderate speeds, the aerodynamic surface deflections must be very large, getting very close to the stall conditions even for standard manoeuvres and light gusts.

In this context, the main innovations of the invention are the manoeuvrability improvement, the enlargement of the conventional airship flight envelope and the possibility to hover both in normal and adverse atmospheric conditions (such as severe wind conditions) with any heading, i.e. with the longitudinal axis in any direction with respect to the wind.

Furthermore the present invention is purposely designed to have a limited ecological impact, in terms of both exhaust and noise, with a relatively limited cost with respect to the known solutions, as reported in claim 1.

Advantageously, the airship of the present invention features a double hull architecture with a central plane housing structure and propellers; lift is provided by a hybrid system consisting in helium for the aerostatic lift and a system of vertical axis propellers which provide the vertical thrust for climb and descent manoeuvres.

In forward flight buoyancy is also enforced by the aerodynamic lift of the whole body.

This aircraft has a wide range of possible fields of application, in addition to the traditional applications of advertising and transportation. Firstly, given its considerable capability of manoeuvering and controlling, it is possible to operate in limited areas or in cases where it is necessary to maintain a given position or follow a precise path, also in adverse atmospheric conditions. Secondly, the limited overall dimensions of this airship make it particularly suitable for activities, such as the patrolling of particular zones or the recording of atmospheric conditions and orographic data of certain areas, which at present are performed mainly with standard aircrafts, such as normal and ultra-lightweight fixed-wing aircrafts, helicopters or satellites. Resuming, the main advantages of this airship are the following:

- low noise level and low impact from the ecological point of view, due to the reduced (or almost nil) exhaust emission into the atmosphere and reduced interference with the surrounding environment;
- very low or nil downward air flow, as this aircraft does not use any rotors to be sustained;
- low energy consumption, thanks to the high efficiency of the electric motors, and the propeller capability of operating at the highest efficiency, thanks to the pitch variability;
- possibility of hovering at low cost (almost nil in calm air) with respect to other similar means such as rotary-wing aircrafts, for example;

possibility of operating at any speed, even very low (between zero and the maximum operating speed);

possibility of getting very near the target object.

Further characteristics and advantages of this highly manoeuvrable aircraft with aerostatic lift, object of the present invention, will be clearer from the following description, which refers to an illustrative and preferred but non-restrictive embodiment of the invention, and from the attached drawings, in which:

FIG. 2 is a lateral view of the highly manoeuvrable aircraft as in FIG. 1;

FIG. 3 is an overhead plan view of the aircraft of FIG. 1, according to the invention;

FIG. 4 is a front view of the aircraft of FIG. 1, according to the invention;

FIG. 5 illustrates further technical details of the ballonet system of the highly manoeuvrable aircraft with aerostatic lift, according to the present invention;

Figure 1:
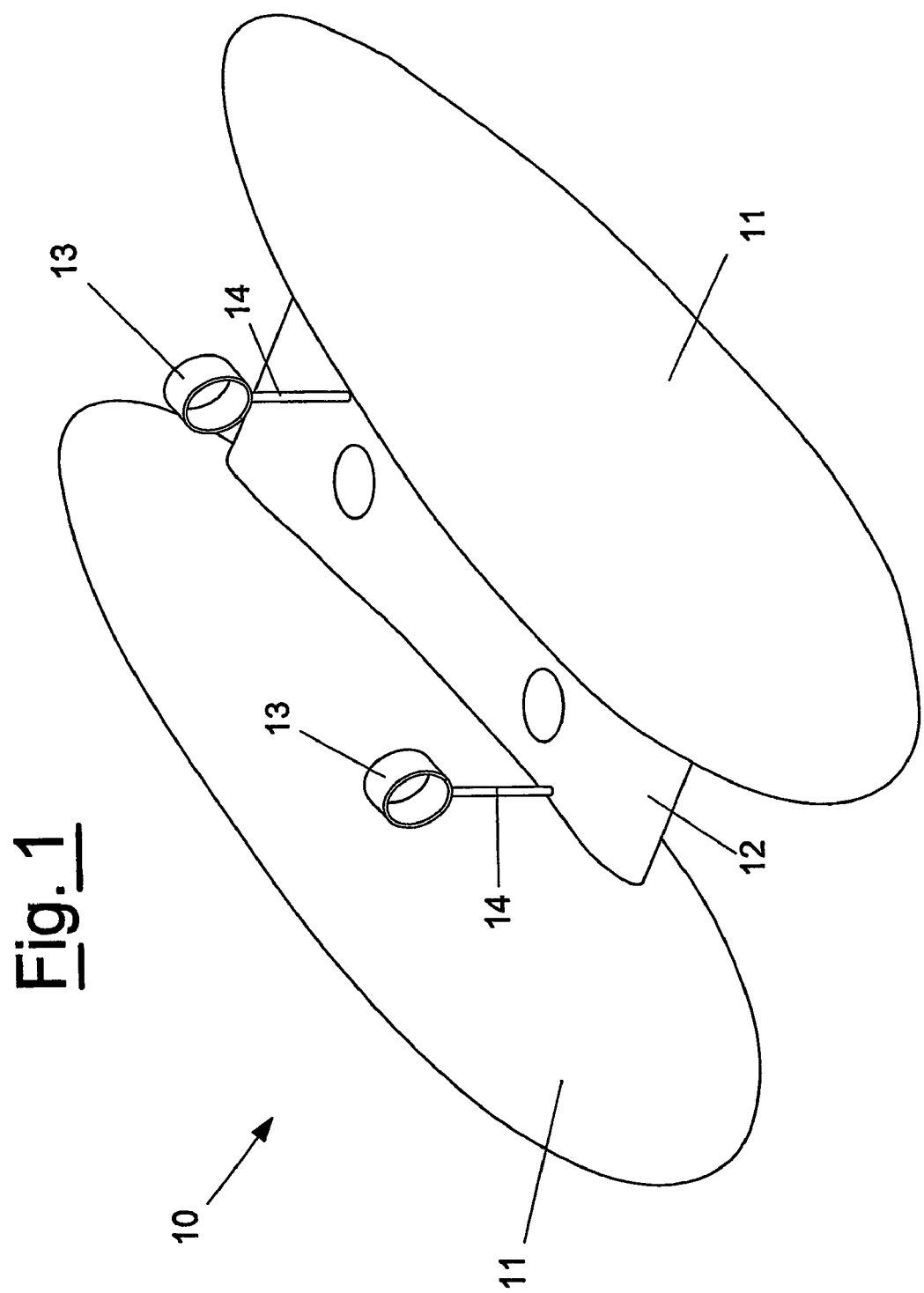
FIG. 1 is a perspective overview of the highly manoeuvrable aircraft with aerostatic lift, according to the present invention.

With reference to the above-mentioned figures, the aircraft with aerostatic lift according to the invention consists of a non-rigid airship, generally indicated by number 10, which can be piloted or radio-controlled.

In preferred but non-restrictive embodiments of the invention, the airship 10 is sustained by helium and consists of two spindle-shaped elements set side by side 11, joined by a connecting structure 12, which defines the characteristic catamaran shape.

In order to contribute to the total weight reduction of the overall structure, the necessary stiffness of the element 12 can be obtained also by the use of pressurised structural elements, properly assembled inside the connecting structure 12 between the two spindle-shaped elements 11.

The aircraft 10 is lacking of deflecting control surfaces as the control system consists of a set of several adjustable electric motors, fed by an on-board generation system, each driving a propeller 13.

In this regard various possible sources of electrical energy for the motors are envisaged, comprising simple rechargeable batteries (for example lithium, NiCd or NiMH), auxiliary generators (turbine or reciprocating engine) fitted on board the airship 10, fuel cells or solar cells.

As shown in FIG. 1, the airship described in the present specification does not use deflecting aerodynamic control surfaces, but the primary command system consists in the above-mentioned propellers 13, properly set to obtain a system of forces and moments, suitable to control and manoeuvre the airship in pitch, roll and yaw.

Two of these propellers 13, has already been mentioned as the vertical axis propellers used to provide vertical thrust, but they also contribute, by differential fore and aft rotational speed, to pitch.

The other propellers 13 are mounted on vertical arms, disposed at a proper distance from the whole body centre of gravity; the rotation of the propeller axes in the horizontal plane, together with the variation of the propellers rotational speed, should allow to vary the direction and the absolute value of each thrust propeller 13. In this way, the aircraft 10 can be manoeuvred in pitch, roll and yaw.

Due to the intrinsic instability of the hull, a stability augmentation system has been designed to achieve the desired dynamic characteristics; in addition, the airship 10 is equipped with a set of control systems with autopilot capabilities, to keep the steady-state flight conditions and follow specific flight paths.

The control system is fly-by-wire and fully automatic according to which, both in the version with the pilot on board and in the radio-controlled one, the aircraft 10 is piloted by a classic helicopter-type command architecture, with a throttle lever, a stick and a group control device.

This automatic control system transfers to the motors the appropriate commands to obtain the required manoeuvre, just as in hovering it transfers the appropriate commands to maintain the required position.

Lastly, the automatic control system can be designed with innovative neural-fuzzy techniques.

Landing and take-off automatic controller, as those used for navigation and emergency procedures, can be performed perfectly well with a classic controller, but the employment of neural networks is one of the methods (currently perhaps the most advanced) to obtain also a considerable level of robustness and failure tolerance, hence the proposed use of neural networks.

According to illustrative and preferential but non-restrictive forms of embodiment of the present invention, the airship 10 can assume at least two possible different configurations.

In a first case, in the configuration with five or six motors, four of them are used for forward flight and control of longitudinal, directional and lateral trim, whereas the fifth (and the sixth, in case) motor provides for rapid ascent and descent. In particular, the first four motors, with vertical propeller plane 13, are fitted on asymmetrical arms 14 which can have a rotating vertical axis and are arranged in a front and a rear station.

The possibility of varying the thrust intensity and direction of each motor permits the flight condition and the attitude keeping.

The fifth and the sixth motor, having horizontal propeller disc with invertible thrust, are fitted in a central position between the two spindle-shaped elements 11. In the six-motors configuration, the differential thrust of the two horizontal motors may effectively contribute to the pitch control.

A second possible configuration of the airship 10 provides for the installation of four motors, two of which are used for forward flight and directional control and the other two for rapid ascent and descent and longitudinal attitude control.

The first two motors, with propeller discs 13 on vertical a plane, are fitted on a horizontal transverse bar at the sides of the gondola and their differential thrust enables directional control of the aircraft while the other two motors, having horizontal propeller disc with invertible thrust direction, are fitted in a central position between the two spindle-shaped elements 11, fore and aft with respect to the aircraft centre of gravity.

The first configuration described enables the attitude control with any heading, also in hovering and in presence of wind, exploiting the possibility of adjusting and properly varying the thrust of the four motors; whereas with the second configuration hovering is possible only in headwind while lateral control is left to the intrinsic stability of the aircraft, which derives from the centre of gravity position below the centre of volume of the sustaining gas.

With particular reference to FIG. 5, which is a detailed representation of the view of FIG. 3, the airship 10 will be provided with two ballonets systems 15, one for each hull 11, to handle altitude variations in a predetermined range without any loss of helium.

The ballonets 15 are managed through an ad-hoc pneumatic system consisting in pipes and valves; they are communicating as the gas volumes of the hulls 11; In particular, ballonets 15 communicate through a duct 16, which ends exactly in the transversal plane where the centre of volume C.V. lies. The duct 16 is provided with two single-acting controlled valves 17, while the hulls 11 communicate by means of a duct 18, provided with a single-acting controlled valve 19 (closed when the bank angle is not null) and a single-acting helium intake valve 20, coupled with a small opening for the hull 11 inflating.

The entrance of the duct 16 consists of a dynamic intake 23, which acts also as the ballonet inflate small opening; At the beginning of the duct 16 there are a unidirectional valve 21 set to prevent the air leakage from ballonets 15, and a compressor 22 used to keep the ballonet 15 pressure.

At the end of the duct 16 there is also a ballonet intake outlet, exactly set in the C.V. hull section and in the middle of ballonets 15.

The differential pressure is obviously equal for the hulls 11 and the ballonets 15, as the ballonet 15 envelopes are not rigid.

However, the differential pressure at the opening of the hulls security valves 25 turns out to be greater than that of ballonet valves 26.

These valves are opened only when the airship 10 reaches the pressure height, namely the altitude at which the gas is completely expanded in the hulls 11.

Strictly speaking, the pressure height is also the maximum operative altitude which can be reached without any loss of helium (which, incidentally, would also lead to a loss of buoyancy).

During the climb, at first the air is released from ballonets 15 and then, if the altitude increases further on, the helium is also released from hulls 11. During the descent, ballonets 15 are blown up using the dynamic intake 23 and compressor 22. Both the hull valves 25 are also used as a safety device, in case a failure occurs and the airship 10 must be quickly brought at the ground.

During the climbing phase, ballonets 15 deflate progressively, through valves from 29 to 26; obviously, the internal overpressure slightly grows, but it is kept in a rather limited range.

During the descent phase, ballonets 15 inflate progressively from the central to the outer sectors. In this way, the air and gas centre of volume are kept approximately in a fixed and coincident longitudinal position, with the buoyancy application point higher than the centre of gravity (beneficial for the lateral stability of the aircraft 10).

Figure 6B:
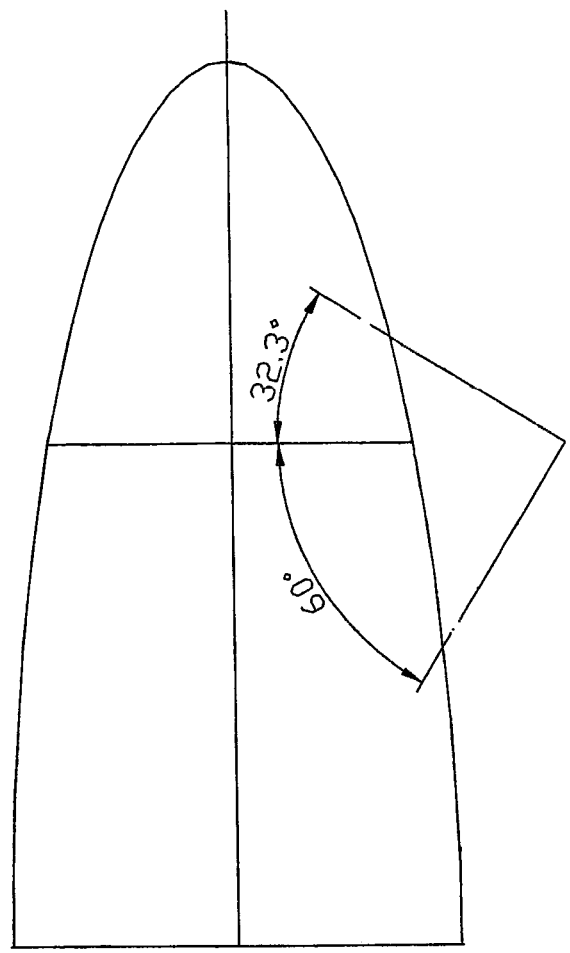
FIGS. 6A and 6B are two schematic views of the landing device of the aircraft, according to the invention.
Figure 6A:
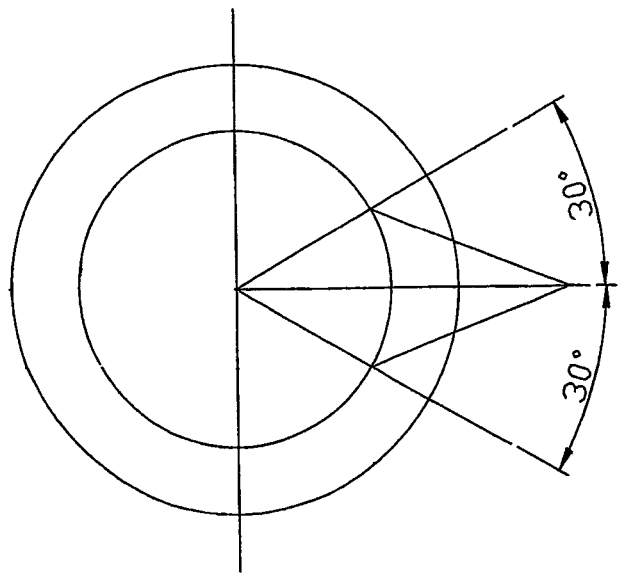

This airship is also characterized by the presence of a couple of retractile landing devices (FIGS. 6A and 6B) formed by rods properly connected by sliding screws, which are almost adherent to the envelopes during the flight, while are moved outward for landing. The main property of this landing device is that the suspension action is performed directly by the helium into the envelopes.

From the description provided, the characteristics of the highly manoeuvrable airship with aerostatic lift, object of the present invention, are clear, and likewise the advantages thereof.

In particular, they are represented by:
ability to maintain the hovering with any heading, independently from the wind direction;
complete control of the attitude by means of the adjustable motors, without the use of the deflecting aerodynamic control surfaces;
excellent safety of the airship, due to the use of the electric motors;
reduction of sensitivity to side wind, due to the catamaran shape (examples of specially-shaped airships exist, but none of them can maintain hovering with any heading independently of the engine);
vertical control with rapid ascent and descent with motor(s) independent from those used for the horizontal propulsion;
possibility of controlling the lateral stability by differentiating the aerostatic thrust between the two hulls due to the connection between the ballonets and the volumes of gas of the two hulls;
robustness of the structure that connects the two hulls, and that may consists of tubular elements in composite material and provides housing and support for the payload;
limited structural weight;
drastic reduction of the supporting equipment and personnel during landing and take-off.

Lastly, it is clear that numerous variations can be made to the airship with aerostatic lift in question, without departing from the principles of novelty inherent in the inventive idea, just as it is clear that, in practical implementation of the invention, the details illustrated can be in any materials, shapes and dimensions according to requirements and the same may be replaced by other technical equivalents.

The invention claimed is:

1. Aircraft with aerostatic lift, comprising a structure, which includes at least two non-rigid spindle-shaped elements side by side (11), joined by at least one connecting element (12), said aircraft also being provided with a movement and attitude control system with a set of several electric motors, of which at least one is adjustable with rotation around an axis perpendicular to the rotation axis of said motor, each of which drives a propeller (13) with fixed or variable pitch, wherein at least one of the propellers (13) is mounted on a vertical arm (14) extending from the connecting element (12) and disposed at a distance from the whole body centre of gravity, and wherein the aircraft consists of an airship (10), which can be piloted or radio-controlled, without deflecting aerodynamic control surfaces and sustained by helium, said movement and attitude control system being solely of the propulsive type, with a ballonets system wherein for each hull during the climbing phase, ballonets deflate progressively, from the outer to the central sector and during the descent phase, ballonets inflate progressively from the central to the outer sectors.

2. Aircraft with aerostatic lift as in claim 1, characterised in that it comprises pressurised structural elements appropriately assembled inside said connecting element (12) between the two spindle-shaped elements (11).

3. Aircraft with aerostatic lift as in claim 1, characterised in that said control system is fly-by-wire and completely automatic, according to which at least one of this propeller (13) is mounted on vertical arm (14) extending from the connecting element (12), disposed at a distance from the whole body centre of gravity, piloting is performed by means of controls with a throttle lever, a stick and a group control, said automatic control system being suitable for transferring the appropriate commands to the motors in order to perform the required manoeuvres.

4. Aircraft with aerostatic lift as in claim 3, characterised in that said first four motors are provided with propeller discs on vertical planes and are fitted on arms (14) having a vertical axis, while said fifth and sixth motor, with horizontal propeller disc and invertible thrust direction, are fitted in a central position between said two spindle-shaped elements (11).

5. Aircraft with aerostatic lift as in claim 1, characterised in that said airship (10) has a configuration with five or six motors, the first four of which are used for forward flight for the longitudinal, directional and lateral control, and the fifth and sixth motor are used for rapid ascent and descent.

6. Aircraft with aerostatic lift as in claim 1, characterised in that said airship (10) has a configuration with four motors, two of which are used for forward flight and directional control and the other two for rapid ascent and descent and longitudinal control.

7. Aircraft with aerostatic lift as in claim 6, characterised in that said first two motors, with propeller discs on vertical planes, are fitted on a horizontal transverse bar, arranged at the sides of the gondola, and are used for directional control of the aircraft, while the other two motors, having horizontal propeller disc with invertible thrust direction, are fitted in a central position between said two spindle-shaped elements (11).

8. Aircraft with aerostatic lift as in claim 1, characterised in that it features a couple of retractile landing devices formed by rods properly connected by sliding screws, which are almost adherent to the envelopes during the flight, while are moved outward for landing.

9. Aircraft with aerostatic lift, comprising a structure, which includes at least two non-rigid spindle-shaped elements side by side (11), joined by at least one connecting element (12), said aircraft also being provided with a movement and attitude control system with a set of several electric motors, of which at least one is adjustable with rotation around an axis perpendicular to the rotation axis of said motor, each of which drives a propeller (13) with fixed or variable pitch, wherein at least one of the propellers (13) is mounted on a vertical arm (14) extending from the connecting element (12) and disposed at a distance from the whole body centre of gravity, and wherein the aircraft consists of an airship (10), which can be piloted or radio-controlled, without deflecting aerodynamic control surfaces and sustained by helium, said movement and attitude control system being solely of the propulsive type, wherein said airship (10) is provided with ballonets system (15), at least one for each spindle-shaped element(11), in order to vary the altitude within a pre-set range without loss of gas, said ballonets (15) being intercommunicating like the volumes of gas of said spindle shaped elements (11) said ballonets (15) communicate by means of a second duct (16), provided with two controlled single-acting valves (17), while said spindle-shaped elements (11) communicate by means of a second duct (18) provided with a first controlled single-acting valve (19) and a second single-acting valve (20), coupled with an aperture for inflating said spindle-shaped elements (11), said ballonets (15) being kept pressurized by a third single-acting valve (21), at the inlet of which a dynamic intake(23) is provided with an inflation aperture, and a compressor (22).

\* \* \* \* \*